(12) United States Patent
Yoshida

(10) Patent No.: US 11,971,798 B2
(45) Date of Patent: Apr. 30, 2024

(54) OPERATION MANAGEMENT APPARATUS, SYSTEM, METHOD, AND NON-TRANSITORY COMPUTER READABLE MEDIUM STORING PROGRAM

(71) Applicant: NEC Corporation, Tokyo (JP)

(72) Inventor: Koichi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 17/641,195

(22) PCT Filed: Jul. 2, 2020

(86) PCT No.: PCT/JP2020/026060
§ 371 (c)(1),
(2) Date: Mar. 8, 2022

(87) PCT Pub. No.: WO2021/059650
PCT Pub. Date: Apr. 1, 2021

(65) Prior Publication Data
US 2022/0342787 A1 Oct. 27, 2022

(30) Foreign Application Priority Data

Sep. 25, 2019 (JP) .................................. 2019-174793

(51) Int. Cl.
*G06F 11/30* (2006.01)
*G06F 11/07* (2006.01)
*G06F 11/32* (2006.01)

(52) U.S. Cl.
CPC ...... *G06F 11/3055* (2013.01); *G06F 11/0757* (2013.01); *G06F 11/327* (2013.01)

(58) Field of Classification Search
CPC . G06F 11/3055; G06F 11/0757; G06F 11/327
See application file for complete search history.

(56) References Cited

U.S. PATENT DOCUMENTS 6,725,401 B1 4/2004 Lindhorst-Ko
6,970,919 B1 11/2005 Doi et al.
(Continued)

FOREIGN PATENT DOCUMENTS

JP 2000-209201 A 7/2000
JP 2002-271392 A 9/2002
(Continued)

OTHER PUBLICATIONS

Extended European Search Report for EP Application No. 20869973. 6, dated Sep. 21, 2022.
(Continued)

*Primary Examiner* — Henry Tsai
*Assistant Examiner* — Christopher A Daley

(57) ABSTRACT

An operation management apparatus (1) includes: a storage unit (11) that stores a plurality of pieces of communication definition information (111), and a plurality of pieces of service definition information (112); a reception unit (12) that receives at least one designation of the service definition information (112) from among the plurality of pieces of service definition information (112); a first specification unit (13) that specifies the communication definition information (111) included in the designated service definition information (112) from among the plurality of pieces of service definition information (112) as specific communication definition information; a second specification unit (14) that specifies the system element of the communication destination defined in the specific communication definition information as a specific system element; and a generation unit (15) that generates output information including the specific system element.

5 Claims, 13 Drawing Sheets

Fig. 3

(56) References Cited

U.S. PATENT DOCUMENTS

| | | | |
|---|---|---|---|
| 8,046,427 B2* | 10/2011 | Yanagi | H04N 1/32561 |
| | | | 709/219 |
| 8,051,335 B1 | 11/2011 | Reimers et al. | |
| 10,394,639 B2* | 8/2019 | Barnes | G06F 11/0709 |
| 2006/0117092 A1* | 6/2006 | Yanagi | H04N 1/32561 |
| | | | 709/224 |
| 2007/0230346 A1 | 10/2007 | Yamada et al. | |
| 2010/0138899 A1* | 6/2010 | Yamamoto | G06F 21/31 |
| | | | 709/229 |
| 2012/0311022 A1 | 12/2012 | Watanabe | |
| 2014/0006432 A1* | 1/2014 | Miyagi | G06F 16/27 |
| | | | 707/758 |
| 2014/0358626 A1* | 12/2014 | Bardhan | G06Q 10/0635 |
| | | | 705/7.28 |
| 2015/0067079 A1* | 3/2015 | Tanabe | H04L 63/10 |
| | | | 709/206 |
| 2016/0191364 A1 | 7/2016 | Ajifu et al. | |
| 2021/0029084 A1* | 1/2021 | Yoshida | H04L 41/5012 |
| 2022/0103702 A1* | 3/2022 | Aoki | H04N 1/00244 |

FOREIGN PATENT DOCUMENTS

| | | |
|---|---|---|
| JP | 2004-260245 A | 9/2004 |
| JP | 2006-157313 A | 6/2006 |
| JP | 2007-266890 A | 10/2007 |
| JP | 2010-146306 A | 7/2010 |
| JP | 2013-012187 A | 1/2013 |
| JP | 2016-122926 A | 7/2016 |
| WO | 86/01019 A1 | 2/1986 |
| WO | 2015/103534 A1 | 7/2015 |
| WO | 2019/187207 A1 | 10/2019 |

OTHER PUBLICATIONS

Anonymous: "PHP—Display Data From Database Table Using PDO : Free Source Code Projects and Tutorials", Aug. 10. 2019. XP055959258.

Japanese Office Action for JP Application No. 2021-548354 dated Feb. 14, 2023 with English Translation.

International Search Report for PCT Application No. PCT/JP2020/026060, dated Sep. 15, 2020.

* cited by examiner

511

SERVICE SEQUENCE MANAGEMENT INFORMATION

| COMMUNICATION SERVICE | SERVICE SEQUENCE |
|---|---|
| COMMUNICATION SERVICE A | COMMUNICATION PATH (1) → (2) → (3) |
| COMMUNICATION SERVICE B | COMMUNICATION PATH (1) → (4) → (5) → (6) |

Fig. 5

COMMUNICATION PATH MANAGEMENT INFORMATION 512

| COMMUNICATION PATH ID | COMMUNICATION SOURCE APPARATUS INFORMATION | VIA-APPARATUS INFORMATION | COMMUNICATION DESTINATION APPARATUS INFORMATION | COMMUNICATION ALLOWABLE TIME |
|---|---|---|---|---|
| COMMUNICATION PATH (1) | USER TERMINAL | FW APPARATUS | GW SERVER/GW FUNCTION | LESS THAN 60 SECONDS |
| COMMUNICATION PATH (2) | GW SERVER/GW FUNCTION | FW APPARATUS→SW APPARATUS | AP SERVER/SERVICE A FUNCTION | LESS THAN 50 SECONDS |
| COMMUNICATION PATH (3) | AP SERVER/SERVICE A FUNCTION | ROUTER APPARATUS | EXTERNAL SYSTEM | LESS THAN 40 SECONDS |
| COMMUNICATION PATH (4) | GW SERVER/GW FUNCTION | FW APPARATUS→SW APPARATUS | AP SERVER/SERVICE B FUNCTION | LESS THAN 50 SECONDS |
| COMMUNICATION PATH (5) | AP SERVER/SERVICE B FUNCTION | SW APPARATUS | DB SERVER/DBMS | LESS THAN 40 SECONDS |
| COMMUNICATION PATH (6) | DB SERVER/DBMS | — | STORAGE APPARATUS | LESS THAN 30 SECONDS |

SERVER MANAGEMENT INFORMATION

| NAME | AVAILABILITY |
|---|---|
| GW SERVER | PLURALITY OF A/A CONFIGURATIONS |
| AP SERVER | PLURALITY OF A/S CONFIGURATIONS |
| DB SERVER | PLURALITY OF A/S CONFIGURATIONS |

NETWORK APPARATUS MANAGEMENT INFORMATION

| NAME | AVAILABILITY |
|---|---|
| FW APPARATUS | PLURALITY OF A/S CONFIGURATIONS |
| SW APPARATUS | PLURALITY OF A/A CONFIGURATIONS |
| ROUTER APPARATUS | PLURALITY OF A/A CONFIGURATIONS |

STORAGE APPARATUS MANAGEMENT INFORMATION

| NAME | AVAILABILITY |
|---|---|
| STORAGE APPARATUS | REDUNDANCY IN APPARATUS |

FUNCTION MANAGEMENT INFORMATION

| NAME | AVAILABILITY |
|---|---|
| GW FUNCTION | AUTOMATIC RESTART BY PROCESS |
| SERVICE A FUNCTION | F/O OCCURS WHEN STOPPED |
| SERVICE B FUNCTION | MANUAL STARTUP REQUIRED WHEN STOPPED |

SERVICE SEQUENCE MANAGEMENT INFORMATION

| COMMUNICATION SERVICE | SERVICE SEQUENCE |
|---|---|
| COMMUNICATION SERVICE A | COMMUNICATION PATH (1)→(2)→(3) |
| COMMUNICATION SERVICE B | COMMUNICATION PATH (1)→(4)→(5)→(6) |

COMMUNICATION PATH MANAGEMENT INFORMATION

| COMMUNICATION PATH ID | COMMUNICATION SOURCE APPARATUS INFORMATION | VIA-APPARATUS INFORMATION | COMMUNICATION DESTINATION APPARATUS INFORMATION | COMMUNICATION ALLOWABLE TIME |
|---|---|---|---|---|
| COMMUNICATION PATH (1) | USER TERMINAL | FW APPARATUS | GW SERVER/GW FUNCTION | LESS THAN 60 SECONDS |
| COMMUNICATION PATH (2) | GW SERVER/GW FUNCTION | FW APPARATUS→SW APPARATUS | AP SERVER/SERVICE A FUNCTION | LESS THAN 50 SECONDS |
| COMMUNICATION PATH (3) | AP SERVER/SERVICE A FUNCTION | ROUTER APPARATUS | EXTERNAL SYSTEM | LESS THAN 40 SECONDS |
| COMMUNICATION PATH (4) | GW SERVER/GW FUNCTION | FW APPARATUS→SW APPARATUS | AP SERVER/SERVICE B FUNCTION | LESS THAN 50 SECONDS |
| COMMUNICATION PATH (5) | AP SERVER/SERVICE B FUNCTION | SW APPARATUS | DB SERVER/DBMS | LESS THAN 40 SECONDS |
| COMMUNICATION PATH (6) | DB SERVER/DBMS | — | STORAGE APPARATUS | LESS THAN 30 SECONDS |

NETWORK APPARATUS MANAGEMENT INFORMATION

| NAME | AVAILABILITY |
|---|---|
| FW APPARATUS | PLURALITY OF A/S CONFIGURATIONS |
| SW APPARATUS | PLURALITY OF A/A CONFIGURATIONS |
| ROUTER APPARATUS | PLURALITY OF A/A CONFIGURATIONS |

FUNCTION MANAGEMENT INFORMATION

| NAME | AVAILABILITY |
|---|---|
| GW FUNCTION | AUTOMATIC RESTART BY PROCESS |
| SERVICE A FUNCTION | F/O OCCURS WHEN STOPPED |
| SERVICE B FUNCTION | MANUAL STARTUP REQUIRED WHEN STOPPED |

SERVER MANAGEMENT INFORMATION

| NAME | AVAILABILITY |
|---|---|
| GW SERVER | PLURALITY OF A/A CONFIGURATIONS |
| AP SERVER | PLURALITY OF A/S CONFIGURATIONS |
| DB SERVER | PLURALITY OF A/S CONFIGURATIONS |

- GW SERVER HAS STOPPED FOR 60 SECONDS OR MORE
- AP SERVER HAS STOPPED FOR 50 SECONDS OR MORE
- EXTERNAL SYSTEM HAS STOPPED FOR 40 SECONDS OR MORE
- FIREWALL HAS STOPPED FOR 50 SECONDS OR MORE
- SWITCH HAS STOPPED FOR 50 SECONDS OR MORE
- ROUTER HAS STOPPED FOR 40 SECONDS OR MORE
- GW FUNCTION HAS HUNG UP FOR 60 SECONDS OR MORE
- A FUNCTION HAS HUNG UP FOR 50 SECONDS OR MORE

SERVICE SEQUENCE MANAGEMENT INFORMATION

| COMMUNICATION SERVICE | SERVICE SEQUENCE |
|---|---|
| COMMUNICATION SERVICE A | COMMUNICATION PATH (1) → (2) → (3) |
| COMMUNICATION SERVICE B | COMMUNICATION PATH (1) → (4) → (5) → (6) |

COMMUNICATION PATH MANAGEMENT INFORMATION

| COMMUNICATION PATH ID | COMMUNICATION SOURCE APPARATUS INFORMATION | VIA-APPARATUS INFORMATION | COMMUNICATION DESTINATION APPARATUS INFORMATION | COMMUNICATION ALLOWABLE TIME |
|---|---|---|---|---|
| COMMUNICATION PATH (1) | USER TERMINAL | FW APPARATUS | GW SERVER/GW FUNCTION | LESS THAN 60 SECONDS |
| COMMUNICATION PATH (2) | GW SERVER/GW FUNCTION | FW APPARATUS → SW APPARATUS | AP SERVER/SERVICE A FUNCTION | LESS THAN 50 SECONDS |
| COMMUNICATION PATH (3) | AP SERVER/SERVICE A FUNCTION | ROUTER APPARATUS | EXTERNAL SYSTEM | LESS THAN 40 SECONDS |
| COMMUNICATION PATH (4) | GW SERVER/GW FUNCTION | FW APPARATUS → SW APPARATUS | AP SERVER/SERVICE B FUNCTION | LESS THAN 50 SECONDS |
| COMMUNICATION PATH (5) | AP SERVER/SERVICE B FUNCTION | SW APPARATUS | DB SERVER/DBMS | LESS THAN 40 SECONDS |
| COMMUNICATION PATH (6) | DB SERVER/DBMS | — | STORAGE APPARATUS | LESS THAN 30 SECONDS |

NETWORK APPARATUS MANAGEMENT INFORMATION

| NAME | AVAILABILITY |
|---|---|
| FW APPARATUS | PLURALITY OF A/A CONFIGURATIONS |
| SW APPARATUS | PLURALITY OF A/A CONFIGURATIONS |
| ROUTER APPARATUS | PLURALITY OF A/A CONFIGURATIONS |

FUNCTION MANAGEMENT INFORMATION

| NAME | AVAILABILITY |
|---|---|
| GW FUNCTION | AUTOMATIC RESTART BY PROCESS |
| SERVICE A FUNCTION | F/O OCCURS WHEN STOPPED |
| SERVICE B FUNCTION | MANUAL STARTUP REQUIRED WHEN STOPPED |

SERVER MANAGEMENT INFORMATION

| NAME | AVAILABILITY |
|---|---|
| GW SERVER | PLURALITY OF A/A CONFIGURATIONS |
| AP SERVER | PLURALITY OF A/S CONFIGURATIONS |
| DB SERVER | PLURALITY OF A/S CONFIGURATIONS |

- GW SERVER HAS STOPPED FOR 60 SECONDS OR MORE
- FIREWALL HAS STOPPED FOR 60 SECONDS OR MORE
- GW FUNCTION HAS HUNG UP FOR 60 SECONDS OR MORE

Fig. 15

OPERATION MANAGEMENT APPARATUS, SYSTEM, METHOD, AND NON-TRANSITORY COMPUTER READABLE MEDIUM STORING PROGRAM

This application is a National Stage Entry of PCT/JP2020/026060 filed on Jul. 2, 2020, which claims priority from Japanese Patent Application 2019-174793 filed on Sep. 25, 2019, the contents of all of which are incorporated herein by reference, in their entirety.

TECHNICAL FIELD

The present invention relates to an operation management apparatus, a system, a method, and a program, and in particular, to an operation management apparatus, a system, a method, and a program that manage an operation of a system providing a plurality of services.

BACKGROUND ART

It is common for an information system to become a platform and for one system to provide a plurality of services. For example, Patent Literature 1 discloses a technique related to a server system that provides a plurality of services to a client apparatus in response to a request from the client apparatus to which a plurality of servers are connected through a network.

CITATION LIST

Patent Literature

Patent Literature 1: Japanese Unexamined Patent Application Publication No. 2013-012187

SUMMARY OF INVENTION

Technical Problem

However, recently, information systems have been becoming increasingly complicated. Therefore, there is a problem that when an interruption of a service has occurred, it is difficult to narrow down system elements such as target devices and target processes to those that caused the interruption.

The present disclosure has been made to solve the above-described problem and an object thereof is to provide an operation management apparatus, a system, a method, and a program for properly narrowing down, when an interruption of a service has occurred, system elements to those that may be the cause of the interruption.

Solution to Problem

An operation management apparatus according to a first example aspect of the present disclosure includes:
  a storage unit configured to store a plurality of pieces of communication definition information associating a system element of a communication source with a system element of a communication destination and defining the associated system elements, and a plurality of pieces of service definition information defining a service that is a combination of some of the plurality of pieces of communication definition information;
  a reception unit configured to receive at least one designation of the service definition information from among the plurality of pieces of service definition information;
  a first specification unit configured to specify the communication definition information included in the designated service definition information from among the plurality of pieces of service definition information as specific communication definition information;
  a second specification unit configured to specify the system element of the communication destination defined in the specific communication definition information as a specific system element; and
  a generation unit configured to generate output information including the specific system element.

An operation management system according to a second example aspect of the present disclosure includes:
  a storage device configured to store a plurality of pieces of communication definition information associating a system element of a communication source with a system element of a communication destination and defining the associated system elements, and a plurality of pieces of service definition information defining a service that is a combination of some of the plurality of pieces of communication definition information;
  a reception unit configured to receive at least one designation of the service definition information from among the plurality of pieces of service definition information;
  a first specification unit configured to refer to the storage device and then specify the communication definition information included in the designated service definition information from among the plurality of pieces of service definition information as specific communication definition information;
  a second specification unit configured to specify the system element of the communication destination defined in the specific communication definition information as a specific system element; and
  a generation unit configured to generate output information including the specific system element.

An operation management method according to a third example aspect of the present disclosure includes:
  receiving, by a computer, at least one designation of service definition information defining a service that is a combination of some of a plurality of pieces of communication definition information from among a plurality of pieces of the service definition information, the communication definition information associating a system element of a communication source with a system element of a communication destination and defining the associated system elements;
  specifying, by the computer, the communication definition information included in the designated service definition information from among the plurality of pieces of service definition information as specific communication definition information;
  specifying, by the computer, the system element of the communication destination defined in the specific communication definition information as a specific system element; and
  generating, by the computer, output information including the specific system element.

An operation management program according to a fourth example aspect of the present disclosure causes a computer to execute:
  a process of receiving at least one designation of service definition information defining a service that is a combination of some of a plurality of pieces of communication definition information from among a plurality of pieces of the service definition information, the communication definition information associating a system element of a communication source with a system element of a communication destination and defining the associated system elements;

a process of specifying the communication definition information included in the designated service definition information from among the plurality of pieces of service definition information as specific communication definition information;

a process of specifying the system element of the communication destination defined in the specific communication definition information as a specific system element; and a process of generating output information including the specific system element.

Advantageous Effects of Invention

According to the present disclosure, it is possible to provide an operation management apparatus, a system, a method, and a program for properly narrowing down, when an interruption of a service has occurred, system elements to those that may be the cause of the interruption.

BRIEF DESCRIPTION OF DRAWINGS

FIG. 5 is a diagram showing an example of service sequence management information according to the second example embodiment;

FIG. 6 is a diagram showing an example of communication path management information according to the second example embodiment;

FIG. 7 is a diagram showing an example of server management information according to the second example embodiment;

FIG. 8 is a diagram showing an example of network apparatus management information according to the second example embodiment;

FIG. 9 is a diagram showing an example of storage apparatus management information according to the second example embodiment;

FIG. 10 is a diagram showing an example of function management information according to the second example embodiment;

FIG. 12 is a diagram showing an example of the operation management processes according to the second example embodiment;

FIG. 13 is a diagram showing an example of an output message according to the second example embodiment;

FIG. 14 is a diagram showing an example of operation management processes according to a third example embodiment; and FIG. 15 is a diagram showing an example of an output message according to the third example embodiment.

DESCRIPTION OF EMBODIMENTS

Example embodiments according to the present disclosure will be described hereinafter in detail with reference to the drawings. The same or corresponding elements are denoted by the same reference signs throughout the drawings, and redundant descriptions will be omitted as necessary for the sake of clarity.

First Example Embodiment

Figure 1:
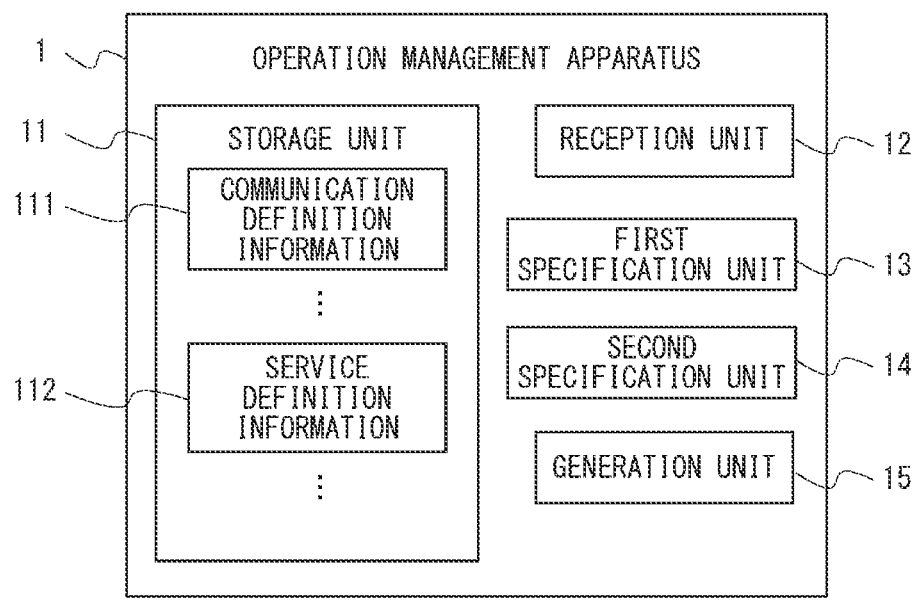
FIG. 1 is a block diagram showing a configuration of an operation management apparatus according to a first example embodiment.

FIG. 1 is a block diagram showing a configuration of an operation management apparatus 1 according to a first example embodiment. In an information system providing a plurality of services, the operation management apparatus 1 is an information processing apparatus that lists, when a specific service is interrupted, system elements that may be the cause of the interruption of the service and outputs them. Note that the information system is an information system composed of a computer, a communication device, storage, and the like. Further, the information system may be, for example, a service providing system that provides a plurality of services through a network or a business system in a company.

Here, the system elements are elements that compose an information system to be operated and managed. The system elements include, for example, a server, a network device, a storage device, and a service function. Note that the "server" refers to a physical server apparatus or a virtual server on which an Operating System (OS) and middleware are running. Further, the "service function" refers to a function provided by middleware, an application program, or the like, and may be simply referred to as a "function" in the following description.

The operation management apparatus 1 includes a storage unit 11, a reception unit 12, a first specification unit 13, a second specification unit 14, and a generation unit 15. The storage unit 11 stores a plurality of pieces of communication definition information 111 and a plurality of pieces of service definition information 112. The communication definition information 111 is information associating a system element of a communication source with a system element of a communication destination and defining the associated system elements. The service definition information 112 is information defining a service that is a combination of some of the plurality of pieces of communication definition information. That is, the service is defined by at least a combination of pieces of the communication definition information 111.

The reception unit 12 receives at least one designation of the service definition information 112 from among the plurality of pieces of service definition information 112. The first specification unit 13 specifies the communication definition information 111 included in the designated service definition information from among the plurality of pieces of service definition information 112 as specific communication definition information. The second specification unit 14 specifies the system element of the communication destination defined in the specific communication definition information as a specific system element. The generation unit 15 generates output information including the specific system element.

Figure 2:
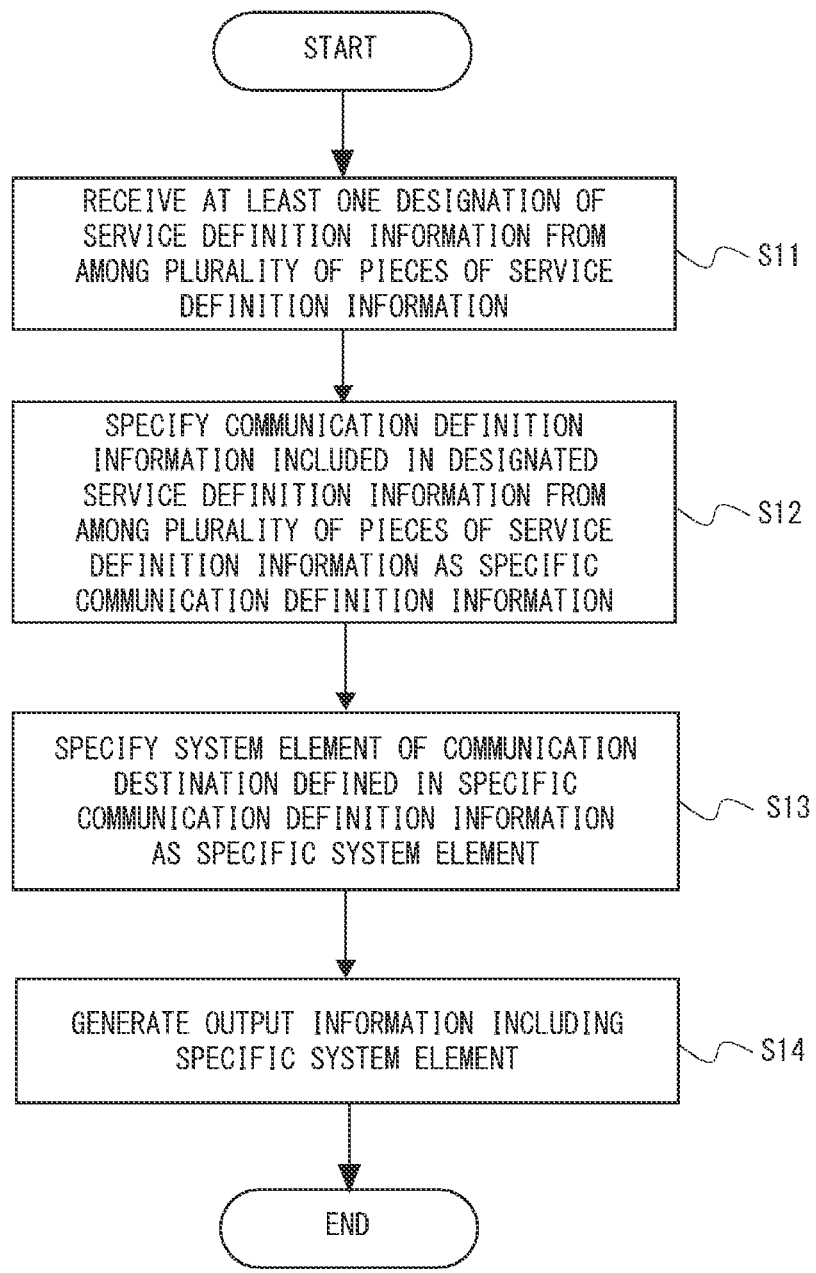
FIG. 2 is a flowchart showing a flow of operation management processes according to the first example embodiment.

FIG. 2 is a flowchart showing a flow of operation management processes according to the first example embodiment. First, the reception unit 12 receives at least one designation of the service definition information from among the plurality of pieces of service definition information (S11). Note that, the service definition information designated is, for example, information indicating that a service being provided has been interrupted. Further, a service is designated by a user or the like of the operation management apparatus 1. Next, the first specification unit 13 specifies the communication definition information 111 included in the service definition information designated in Step S11 from among the plurality of pieces of service definition information 112 as specific communication definition information (S12). Then the second specification unit 14 specifies a system element of a communication destination defined in the specific communication definition information as a specific system element (S13). After that, the generation unit 15 generates output information including the specific system element (S14).

As described above, in the first example embodiment, by tracing the system elements of the communication destination from the designated service definition information based on the communication definition information, it is possible to list the specific system elements that may be the cause of the interruption of the service. Further, by outputting the generated output information, for example, a person in charge of operation can properly narrow down, when an interruption of a service has occurred, system elements to those that may be the cause of the interruption.

Note that the operation management apparatus 1 includes, as a configuration that is not shown, a processor, a memory, and a storage device. Further, a computer program in which processes of the operation management method according to this example embodiment are implemented is stored in the storage device. Further, the processor loads the computer program from the storage device into the memory and executes the loaded computer program. In this way, the processor implements the functions of the reception unit 12, the first specification unit 13, the second specification unit 14, and the generation unit 15.

Alternatively, each of the reception unit 12, the first specification unit 13, the second specification unit 14, and the generation unit 15 may be implemented by dedicated hardware. Further, some or all of the components of each apparatus may be implemented by a general-purpose or dedicated circuit (circuitry), a processor or the like, or a combination thereof. They may be formed of a single chip, or may be formed of a plurality of chips connected to each other through a bus. Some or all of the components of each apparatus may be implemented by a combination of the above-described circuit or the like and a program. Further, as the processor, a Central Processing Unit (CPU), a Graphics Processing Unit (GPU), a field-programmable gate array (FPGA) or the like may be used.

Further, when some or all of the components of the operation management apparatus 1 are implemented by a plurality of information processing apparatuses, circuits, or the like, the plurality of information processing apparatuses, the circuits, or the like may be disposed in one place in a centralized manner or arranged in a distributed manner. For example, the information processing apparatuses, the circuits, or the like may be implemented as a client-server system, a cloud computing system, or the like, or a configuration in which the apparatuses or the like are connected to each other through a communication network. Alternatively, the functions of the operation management apparatus 1 may be provided in the form of Software as a Service (SaaS).

Second Example Embodiment

Figure 3:
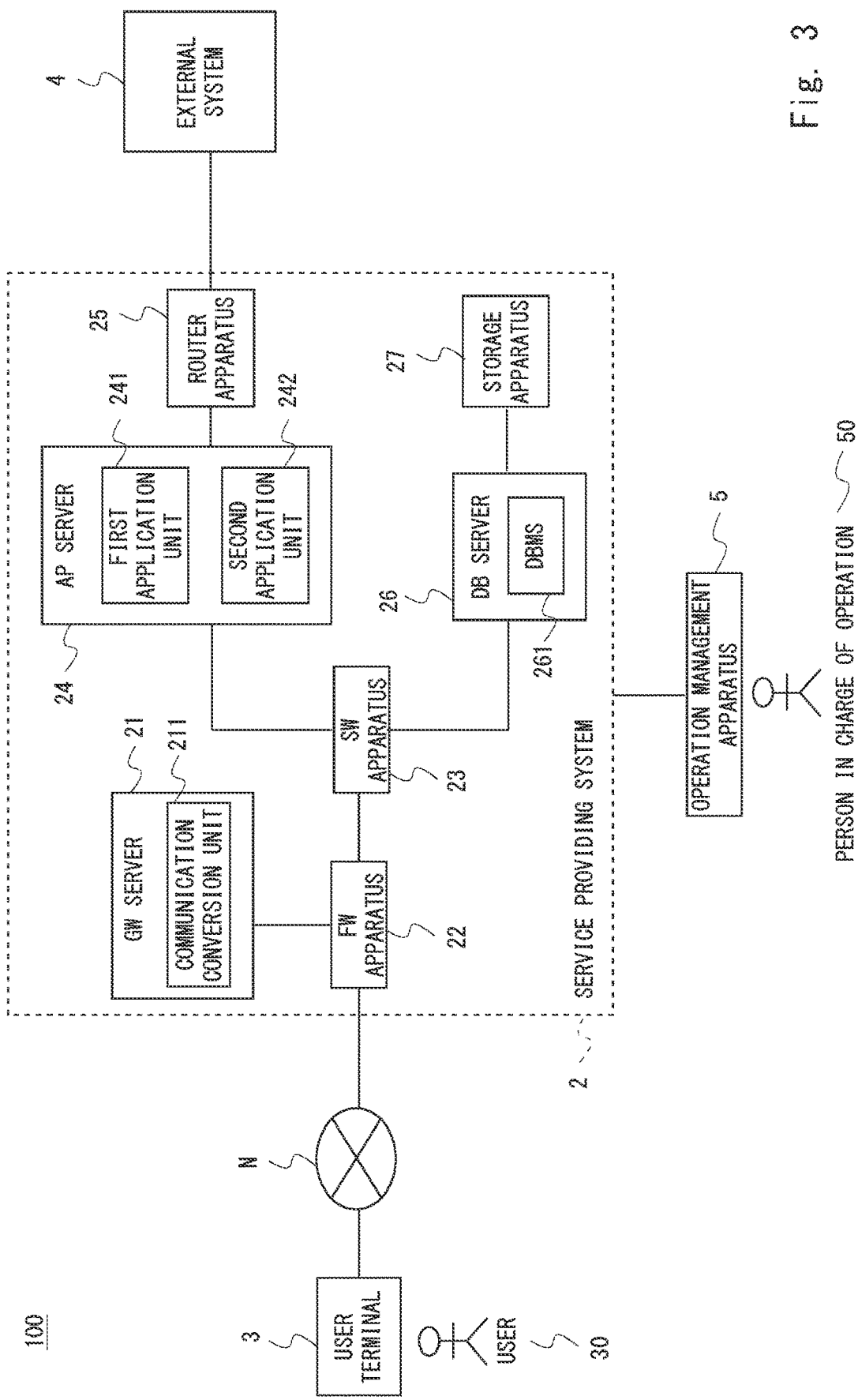
FIG. 3 is a block diagram showing an overall configuration including a service providing system and an operation management apparatus according to a second example embodiment.

A second example embodiment is an application example of the first example embodiment described above. FIG. 3 is a block diagram showing an overall configuration including a service providing system 2 and an operation management apparatus 5 according to the second example embodiment. A user terminal 3 is connected to the service providing system 2 through a network N. Note that the network N is a communication network such as the Internet or a dedicated line.

The user terminal 3 is an information processing apparatus operated by a user 30, and is, for example, a personal computer, a smartphone, a tablet terminal, or the like. The user terminal 3 transmits a request for a predetermined service to the service providing system 2 in response to an operation performed by the user 30, receives a response from the service providing system 2, and displays it on a screen (not shown).

The service providing system 2 is connected to the user terminal 3 through the network N, and is also connected to the operation management apparatus 5 and an external system 4. The service providing system 2 is an information system that performs, in response to a request in which a service is designated, processing of the designated service and returns a result of the processing to a requestor. The service providing system 2 can provide a plurality of services to the user terminal 3. Further, the service providing system 2 can simultaneously receive service requests from two or more user terminals 3 in parallel.

The service providing system 2 includes a Gateway (GW) server 21, a Firewall (FW) apparatus 22, a Switch (SW) apparatus 23, an Application (AP) server 24, a router apparatus 25, a Database (DB) server 26, and a storage apparatus 27. However, the configuration of the service providing system 2 is not limited thereto. The service providing system 2 may include at least one of a computer server, a network device, a storage apparatus, and the like, and may provide a plurality of different services.

The FW apparatus 22 is a network device that is connected to the network N, the GW server 21, and the SW apparatus 23, and that relays and monitors communication between the service providing system 2 and the network N.

The GW server 21 is a computer that is connected to the FW apparatus 22, and that includes a communication conversion unit 211 that converts a protocol between the service providing system 2 and the network N. The communication conversion unit 211 is a GW function that performs mutual conversion between different communication protocols and connects the different communication protocols to each other.

The SW apparatus 23 is a network device that is connected to the FW apparatus 22, the AP server 24, and the DB server 26, and that relays communication data passing through communication between these apparatuses and servers.

The AP server 24 is a computer in which an AP server as middleware is running. Further, it is a computer in which a plurality of applications are running, which applications are operating on the AP server and provide a plurality of services. The AP server 24 is connected to the SW apparatus 23 and the router apparatus 25. The AP server 24 includes a first application unit 241 and a second application unit 242. The first application unit 241 is a communication service A function for providing a communication service A. The second application unit 242 is a communication service B function for providing a communication service B. The first and the second application units 241 and 242 are implemented by an application program operating on the AP server. Note that the AP servers 24 may be distributed to a plurality of servers via a load balancer or made redundant. In this case, a plurality of applications may be running in each AP server, and the AP servers may be different for each application.

The router apparatus 25 is a network device that is connected to the external system 4 and the AP server 24, and that routes communication packets passing through communication performed inside and outside the service providing system 2.

The DB server 26 is a computer in which a DB server (a Database (DB) Management System (DBMS) 261) as middleware is running and which manages data stored in the storage apparatus 27. The DB server 26 is connected to the SW apparatus 23 and the storage apparatus 27.

The storage apparatus 27 is a storage device connected to the DB server 26. The storage apparatus 27 stores a set of data managed by the DB server 26.

Although the external system 4 is an information system connected to the service providing system 2 through a network (not shown), the data thereof is not managed by the operation management apparatus 5. The external system 4 is, for example, an information system cooperating with the service providing system 2.

Based on the above, a flow in which the service providing system 2 provides the communication services A and B will be described. First, the user terminal 3 requests the communication service A through the network N in response to an operation performed by the user 30, and the service providing system 2 provides the communication service A to the user terminal 3. At this time, the request is sent from the user terminal 3 to the first application unit 241 through the network N, the FW apparatus 22, the GW server 21, and the SW apparatus 23. Then the request is sent from the first application unit 241 to the external system 4 through the router apparatus 25. When the external system 4 receives the request of the communication service A, it transmits a response to the request. The response is sent from the external system 4 to the first application unit 241 through the router apparatus 25. The response is further sent from the first application unit 241 to the user terminal 3 through the SW apparatus 23, the FW apparatus 22, and the network N. In this way, the communication service A is provided.

Further, the user terminal 3 requests the communication service B through the network N in response to an operation performed by the user 30, and the service providing system 2 provides the communication service B to the user terminal 3. At this time, the request is sent from the user terminal 3 to the second application unit 242 through the network N, the FW apparatus 22, the GW server 21, and the SW apparatus 23. The request is further sent from the second application unit 242 to the DBMS 261 of the DB server 26 through the SW apparatus 23. When the DBMS 261 receives the request, it accesses the storage apparatus 27 for the request and transmits a result of the access as a response. The response is sent from the DBMS 261 to the user terminal 3 through the SW apparatus 23, the FW apparatus 22 and the network N. In this way, the communication service B is provided.

The operation management apparatus 5 is an example of the operation management apparatus 1 described above, and is a computer connected to the service providing system 2. Further, the operation management apparatus 5 is an information processing apparatus operated directly or indirectly through a management terminal (not shown) by a person in charge of operation 50. Further, the operation management apparatus 5 may be a computer system in which functions are distributed by a plurality of computer apparatuses or made redundant. Therefore, the operation management apparatus 5 may also be referred to as an operation management system.

Figure 4:
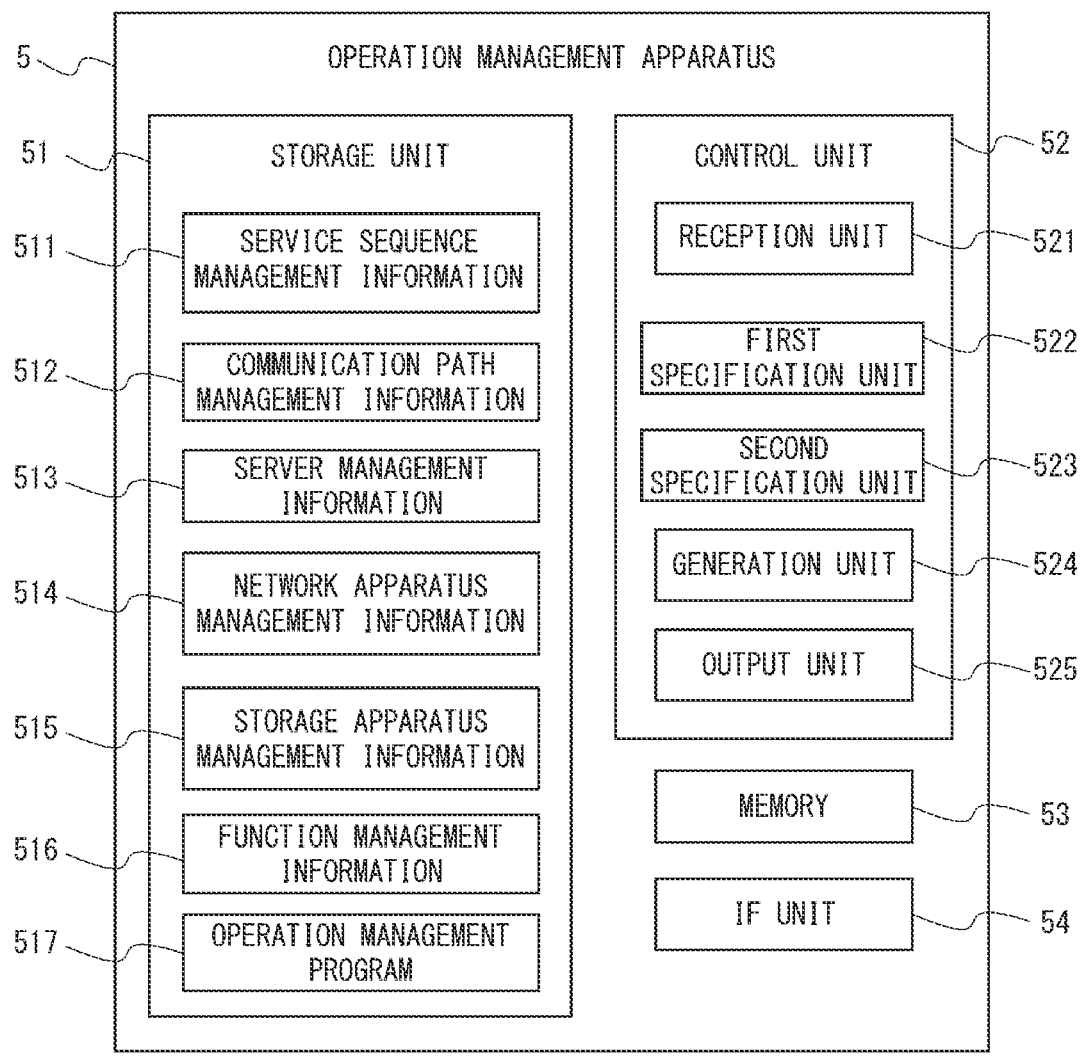
FIG. 4 is a block diagram showing a configuration of the operation management apparatus according to the second example embodiment.

FIG. 4 is a block diagram showing a configuration of the operation management apparatus 5 according to the second example embodiment. The operation management apparatus 5 includes a storage unit 51, a control unit 52, a memory 53, and an Interface (IF) unit 54.

The storage unit 51 is a storage device such as a hard disk and a flash memory. The storage unit 51 stores service sequence management information 511, communication path management information 512, server management information 513, network apparatus management information 514, storage apparatus management information 515, function management information 516, and an operation management program 517.

The service sequence management information 511 is information for managing a combination of a communication service and a service sequence. Note that the combination of the communication service and the service sequence is an example of the service definition information 112 described above. The communication service is at least identification information such as the name of the communication service. The service sequence is information defining an order in which the communication path information (the communication definition information 111) is passed through for each communication service. FIG. 5 is a diagram showing an example of the service sequence management information 511 according to the second example embodiment. For example, it is shown that the communication service A reaches a provider of the service A from a communication path (1) via a communication path (2) and a communication path (3).

The communication path management information 512 is information for managing communication path information. Note that the communication path information is an example of the communication definition information 111 described above, and is information defining system elements of a communication source and a communication destination, a via-apparatus (i.e., an apparatus that is passed through), and a communication allowable time for each communication path. Note that the system elements of the communication source and the communication destination include pairs of servers and functions (applications etc.). Further, the via-apparatus is at least one communication device that is passed through between the communication source and the communication destination. Further, the system elements of the communication source and the communication destination and the via-apparatus may be identification information. Further, the communication allowable time is a threshold of a waiting time of a communication response that is allowable in the system element of the communication source, and is an example of a timeout value. FIG. 6 is a diagram showing an example of the communication path management information 512 according to the second example embodiment. Here, it is shown that communication path information is expressed by a combination of a communication path ID, communication source apparatus information, via-apparatus information, communication destination apparatus information, and the communication allowable time. For example, it is shown that the communication path (1) is a communication path from the user terminal 3 to the GW function of the GW server 21 via the FW apparatus 22, and that the time allowed for the communication path (1) is less than 60 seconds.

The server management information 513 is information for managing server information associating a server (a type of a server or identification information thereof) with availability of the server. FIG. 7 is a diagram showing an example of the server management information 513 according to the second example embodiment. For example, the availability of the GW server is secured by a plurality of active/active configurations, and the availability of the AP server is secured by a plurality of active/standby configurations. Note that availability refers to the ability of the system to operate continuously.

The network apparatus management information 514 is information for managing network apparatus information associating a network apparatus (a type of a network apparatus or identification information thereof) with availability of the network apparatus. FIG. 8 is a diagram showing an example of the network apparatus management information 514 according to the second example embodiment. For example, it is shown that the availability of the FW apparatus is secured by a plurality of active/standby configurations.

The storage apparatus management information 515 is information for managing storage apparatus information associating a storage apparatus (a type of a storage apparatus or identification information thereof) and availability of the storage apparatus. FIG. 9 is a diagram showing an example of the storage apparatus management information 515 according to the second example embodiment. For example, it is shown that the availability of the storage apparatus is secured by redundancy in the apparatus.

The function management information 516 is information for managing function information associating a function (of middleware or an application) with availability of the function. FIG. 10 is a diagram showing an example of the function management information 516 according to the second example embodiment. For example, it is shown that the availability of the GW function is secured by an automatic restart by a process. Further, it is shown that in the availability of the service A function, Fail/Over (F/O) occurs when the service A function is stopped.

Referring back to FIG. 4, the description will be continued. The operation management program 517 is a computer program on which operation management processes according to this example embodiment are implemented. Note that all or some of the service sequence management information 511, the communication path management information 512, the server management information 513, the network apparatus management information 514, the storage apparatus management information 515, and the function management information 516 may be stored in an external storage device connected to the operation management apparatus 5, and the control unit 52 may appropriately refer to these pieces of information.

The memory 53, which is a volatile storage device such as a Random Access Memory (RAM), is a storage area for temporarily holding information when the control unit 52 is operated. The IF unit 54 is an interface that receives/outputs data from/to the outside of the operation management apparatus 5. For example, the IF unit 54 receives an operation performed by the person in charge of operation 50 through an input device (not shown) such as a keyboard, a mouse, and a touch panel, and outputs the received operation content to the control unit 52. Further, in response to an instruction from the control unit 52, the IF unit 54 outputs data to a touch panel, a display apparatus, a printer, and the like (not shown).

The control unit 52 is a processor that controls each component of the operation management apparatus 5, that is, a control apparatus. The control unit 52 loads the operation management program 517 from the storage unit 51 into the memory 53 and executes the loaded operation management program 517. In this way, the control unit 52 implements the functions of a reception unit 521, a first specification unit 522, a second specification unit 523, a generation unit 524, and an output unit 525.

The reception unit 521 is a specific example of the reception unit 12 described above, and receives designation of an interrupted service. The first specification unit 522 is a specific example of the first specification unit 13 described above, and refers to the service sequence management information 511 and then specify a service sequence (specific communication definition information) associated with the designated service.

The second specification unit 523 is a specific example of the second specification unit 14 described above, and refers to the communication path management information 512 and then specify the via-apparatus information (a specific communication device), the communication destination apparatus information, and the communication allowable time associated with each communication path ID included in the specified service sequence.

The generation unit 524 is a specific example of the generation unit 15 described above, and generates a message indicating a failure probability for the specific system element as output information. Here, the generation unit 524 generates the message including the timeout value in the communication source associated with the specific system element. By doing so, the probability of the cause of the failure can be made more concrete.

Further, the generation unit 524 generates a message corresponding to each of the server and the function included in the specific system element. In particular, the generation unit 524 generates the messages corresponding to the respective server and function included in the specific system element, the messages each including the timeout value in the communication source associated with the specific system element.

Further, the generation unit 524 generates the message further including the specific communication device. Further, the generation unit 524 generates, for the specific communication device that is common among the specific communication devices, the message including a shorter timeout value among the timeout values in the communication sources associated with the respective specific communication devices.

The output unit 525 outputs the message generated by the generation unit 524 as output information. For example, the output unit 525 causes a display apparatus (not shown) connected to the operation management apparatus 5 to display the generated message. Alternatively, the output unit 525 may transmit the generated message to a terminal used by the person in charge of operation 50 through the network N.

Figure 11:
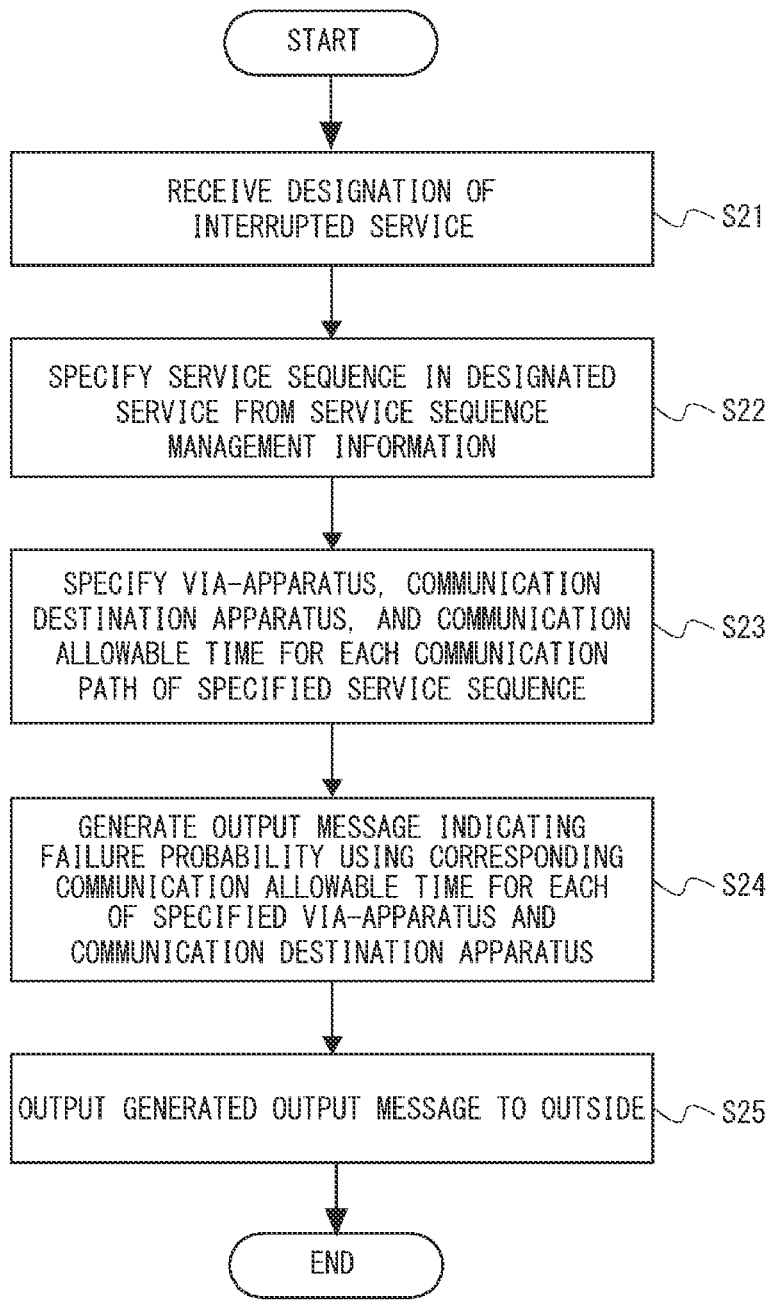
FIG. 11 is a flowchart showing a flow of operation management processes according to the second example embodiment.

FIG. 11 is a flowchart showing a flow of operation management processes according to the second example embodiment. Further, FIG. 12 is a diagram showing an example of the operation management processes according to the second example embodiment. FIG. 11 will be described below and FIG. 12 will also be referred to as appropriate.

First, the reception unit 521 receives designation of an interrupted service (S21). For example, the reception unit 521 receives designation of the communication service A. Next, the first specification unit 522 specifies a service sequence in the designated service from the service sequence management information 511 (S22). For example, the first specification unit 522 specifies a service sequence of the order of the communication paths (1), (2), and (3) associated with the communication service A from the service sequence management information 511.

Then the second specification unit 523 specifies the via-apparatus, the communication destination apparatus, and the communication allowable time for each communication path of the specified service sequence (S23). For example, the second specification unit 523 specifies the FW apparatus as the via-apparatus information associated with the communication path (1), the pair of the GW server and the GW function as the communication destination apparatus information, and less than 60 seconds as the communication allowable time. Further, for the communication paths (2) and (3), the second specification unit 523 performs a specification similar to that done for the communication path (1).

At this time, when the identification information of each of the via-apparatus and the communication destination apparatus is stored in the communication path management information 512 and the character string of the name thereof is not stored, the second specification unit 523 acquires the character string of a name corresponding to each identification information from the server management information 513, the network apparatus management information 514, the storage apparatus management information 515, and the function management information 516. For example, the second specification unit 523 acquires character string information of the GW server as the communication destination apparatus information from the server management information 513. Further, the second specification unit 523 acquires character string information of the FW apparatus as the via-apparatus from the network apparatus management information 514. Further, the second specification unit 523 acquires character string information of the GW function as the communication destination apparatus information from the function management information 516. Further, the second specification unit 523 may acquire a character string indicating availability from the server management information 513 or the like.

Next, the generation unit 524 generates an output message indicating a failure probability using the corresponding communication allowable time for each of the specified via-apparatus and communication destination apparatus (S24). For example, the generation unit 524 generates an output message indicating a probability that the communication destination apparatus "GW server" has stopped for the communication allowable time of "60 seconds" or more. Note that the communication allowable time of "60 seconds" included in the output message is a timeout value in the communication source apparatus "user terminal" associated with the communication destination apparatus "GW server". Similarly, the generation unit 524 generates an output message indicating a probability that the communication destination apparatus "AP server" has stopped for the communication allowable time of "50 seconds" or more.

Here, the "FW apparatus" as the via-apparatus is passed through in both of the communication paths (1) and (2). In this case, the generation unit 524 may generate a message including a shorter time among the communication allowable times in the communication source associated with the specific communication device of each communication path. For example, the communication allowable time of "50 seconds" in the communication source apparatus "GW server/GW function" of the communication path (2) is shorter than the communication allowable time of "60 seconds" in the communication source apparatus "user terminal" of the communication path (1). Therefore, the generation unit 524 generates, as the output message, an output message indicating a probability that the via-apparatus information "FW apparatus" has stopped for the communication allowable time of "50 seconds" or more. This configuration reduces unnecessary messages indicating failure probabilities and allows a person in charge of operation to more properly narrow down the failure probabilities.

Note that, as described above, when the second specification unit 523 acquires a character string indicating availability from the server management information 513 or the like, the generation unit 524 may generate an output message based on the character string indicating availability. Alternatively, the generation unit 524 previously registers character strings such as "hang up" for the case of a function and "stop" for other cases, and the generation unit 524 may make a selection from among these character strings and use the selected one for the output message.

After that, the output unit 525 outputs the generated output message (S25). FIG. 13 is a diagram showing an example of an output message according to the second example embodiment.

As described above, in the second example embodiment, by tracing the communication path management information with the service sequence defined for an interrupted service as a clue, it is possible to specify the system elements (the destination apparatus, the via-apparatus) that may be the cause of the occurrence of a failure in the service. In particular, failure probabilities of the via-apparatus can be exhaustively known by listing them. Further, since the communication destination apparatus generates an output message by separating the failure probabilities at a server level (hardware, an OS, middleware) or an application level, isolation of the cause of the failure can be promoted. Further, by using the timeout value in the communication source of each communication path, a more specific and detailed probability of the cause of the failure can be known. Furthermore, when the same apparatus is specified a plurality of times, a person in charge of operation can obtain more reasonable failure probability information by generating an output message using a shorter timeout value and not generating an output message of a longer timeout value.

Third Example Embodiment

A third example embodiment is another example of the second example embodiment described above. In the third example embodiment, a case in which a system element that may be the cause of a failure is specified when interruptions of a plurality of service have occurred simultaneously will be described. Note that since the configurations of an operation management apparatus and an information system to be managed according to the third example embodiment are the same as those of the second example embodiment, the illustration and detailed description thereof will be omitted. The difference between this example embodiment and the second example embodiment will be described below.

The first specification unit 522 according to the third example embodiment specifies, when the reception unit 521 receives two or more designations of the service definition information, communication definition information that is common among the pieces of communication definition information defined in the respective pieces of designated service definition information as the specific communication definition information. By doing so, the efficiency of narrowing down the system elements to those that may be the cause of the failure is improved.

FIG. 14 is a diagram showing an example of operation management processes according to the third example embodiment. Here, it is assumed that the interruption of the communication service A and the interruption of the communication service B have occurred simultaneously. In this case, the reception unit 521 receives designation of the communication services A and B. Then the first specification unit 522 specifies a service sequence of each of the communication services A and B. Here, the service sequence of the communication service A is the order of the communication paths (1), (2), and (3), and the service sequence of the communication service B is the order of the communication paths (1), (4), (5), and (6). Therefore, the first specification unit 522 compares the communication paths of each service sequence with each other, and specifies the common communication path (1) as specific communication definition information. That is, the first specification unit 522 narrows down the communication paths to a communication path that is common among a plurality of service sequences.

Therefore, in the following processes, the second specification unit 523 refers to the communication path management information 512 for the specified communication path (1) and then specifies via-apparatus information, communication destination apparatus information, and a communication allowable time, and the generation unit 524 generates an output message based on the specified information as described above in Step S24. Then the output unit 525 outputs the generated output message. FIG. 15 is a diagram showing an example of an output message according to the third example embodiment.

As described above, in FIG. 13, as only the communication service A has been interrupted, eight failure probabilities are listed. In contrast to this, in FIG. 15, as the communication services A and B have been interrupted, it is shown that the failure probabilities have been narrowed down to three. That is, in ordinary cases, when there are a plurality of interrupted services, although a range of influence of the interrupted services on the operation management side is wide and the burden imposed thereon is large, the accuracy of narrowing down system elements to ones that may be the cause of a failure is improved according to the third example embodiment.

Other Example Embodiments

Note that although the present disclosure has been described as a hardware configuration in the above example embodiments, the present disclosure is not limited thereto. In the present disclosure, any processing can also be implemented by causing a Central Processing Unit (CPU) to execute a computer program.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, DVD (Digital Versatile Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and may be changed as appropriate without departing from the spirit of the present disclosure. Further, the present disclosure may be executed by combining the example embodiments as appropriate.

The whole or part of the example embodiments disclosed above can be described as, but not limited to, the following supplementary notes.

(Supplementary Note A1)

An operation management apparatus comprising:
- a storage unit configured to store a plurality of pieces of communication definition information associating a system element of a communication source with a system element of a communication destination and defining the associated system elements, and a plurality of pieces of service definition information defining a service that is a combination of some of the plurality of pieces of communication definition information;
- a reception unit configured to receive at least one designation of the service definition information from among the plurality of pieces of service definition information;
- a first specification unit configured to specify the communication definition information included in the designated service definition information from among the plurality of pieces of service definition information as specific communication definition information;
- a second specification unit configured to specify the system element of the communication destination defined in the specific communication definition information as a specific system element; and
- a generation unit configured to generate output information including the specific system element.

(Supplementary Note A2)

The operation management apparatus according to Supplementary note A1, wherein when the reception unit receives two or more designations of the service definition information, the first specification unit specifies, as the specific communication definition information, communication definition information that is common among the pieces of communication definition information defined in the respective pieces of designated service definition information.

(Supplementary Note A3)

The operation management apparatus according to Supplementary note A1 or A2, wherein the generation unit generates a message indicating a failure probability for the specific system element as the output information.

(Supplementary Note A4)

The operation management apparatus according to Supplementary note A3, wherein
the communication definition information includes a timeout value in the system element of the communication source, and the generation unit generates the message including the timeout value in the communication source associated with the specific system element.

(Supplementary Note A5)

The operation management apparatus according to Supplementary note A4, wherein
the system element of the communication destination includes a pair of a server and a function, and
the generation unit generates the messages corresponding to the respective server and function included in the specific system element, the messages each including the timeout value in the communication source associated with the specific system element.

(Supplementary Note A6)

The operation management apparatus according to Supplementary note A3, wherein
the system element of the communication destination includes a pair of a server and a function, and
the generation unit generates the messages corresponding to the respective server and function included in the specific system element.

(Supplementary Note A7)

The operation management apparatus according to any one of Supplementary note A1 to A6, wherein
the communication definition information further includes at least one communication device that is passed through between the communication source and the communication destination,
the second specification unit further specifies the communication device defined in the specific communication definition information as a specific communication device, and
the generation unit generates the output information further including the specific communication device.

(Supplementary Note A8)

The operation management apparatus according to Supplementary note A7, wherein
the second specification unit specifies two or more specified communication devices, and
the generation unit generates, for the specific communication device that is common among the specific communication devices, the message including a shorter timeout value among the timeout values in the communication sources associated with the respective specific communication devices.

(Supplementary Note B1)

An operation management system comprising:
a storage device configured to store a plurality of pieces of communication definition information associating a system element of a communication source with a system element of a communication destination and defining the associated system elements, and a plurality of pieces of service definition information defining a service that is a combination of some of the plurality of pieces of communication definition information;
a reception unit configured to receive at least one designation of the service definition information from among the plurality of pieces of service definition information;
a first specification unit configured to refer to the storage device and then specify the communication definition information included in the designated service definition information from among the plurality of pieces of service definition information as specific communication definition information;
a second specification unit configured to specify the system element of the communication destination defined in the specific communication definition information as a specific system element; and
a generation unit configured to generate output information including the specific system element.

(Supplementary Note B2)

The operation management system according to Supplementary note B1, wherein when the reception unit receives two or more designations of the service definition information, the first specification unit specifies, as the specific communication definition information, communication definition information that is common among the pieces of communication definition information defined in the respective pieces of designated service definition information.

(Supplementary Note C1)

An operation management method comprising:
receiving, by a computer, at least one designation of service definition information defining a service that is a combination of some of a plurality of pieces of communication definition information from among a plurality of pieces of the service definition information, the communication definition information associating a system element of a communication source with a system element of a communication destination and defining the associated system elements;
specifying, by the computer, the communication definition information included in the designated service definition information from among the plurality of pieces of service definition information as specific communication definition information;
specifying, by the computer, the system element of the communication destination defined in the specific communication definition information as a specific system element; and
generating, by the computer, output information including the specific system element.

(Supplementary Note D1)

An operation management program for causing a computer to execute:
a process of receiving at least one designation of service definition information defining a service that is a combination of some of a plurality of pieces of communication definition information from among a plurality of pieces of the service definition information, the communication definition information associating a system element of a communication source with a system element of a communication destination and defining the associated system elements;
a process of specifying the communication definition information included in the designated service definition information from among the plurality of pieces of service definition information as specific communication definition information;
a process of specifying the system element of the communication destination defined in the specific communication definition information as a specific system element; and
a process of generating output information including the specific system element.

Although the present invention has been described with reference to the example embodiments, the present invention is not limited to the above-described example embodiments. Various changes that may be understood by those skilled in the art may be made to the configurations and details of the present invention within the scope of the invention.

This application is based upon and claims the benefit of priority from Japanese patent application No. 2019-174793, filed on Sep. 25, 2019, the disclosure of which is incorporated herein in its entirety by reference.

REFERENCE SIGNS LIST

1 OPERATION MANAGEMENT APPARATUS
11 STORAGE UNIT
111 COMMUNICATION DEFINITION INFORMATION
112 SERVICE DEFINITION INFORMATION
12 RECEPTION UNIT
13 FIRST SPECIFICATION UNIT
14 SECOND SPECIFICATION UNIT
15 GENERATION UNIT
100 SYSTEM
N NETWORK
2 SERVICE PROVIDING SYSTEM
21 GW SERVER
211 COMMUNICATION CONVERSION UNIT
22 FW APPARATUS
23 SW APPARATUS
24 AP SERVER
241 FIRST APPLICATION UNIT
242 SECOND APPLICATION UNIT
25 ROUTER APPARATUS
26 DB SERVER
261 DBMS
27 STORAGE APPARATUS
3 USER TERMINAL
30 USER
4 EXTERNAL SYSTEM
5 OPERATION MANAGEMENT APPARATUS
50 PERSON IN CHARGE OF OPERATION
51 STORAGE UNIT
511 SERVICE SEQUENCE MANAGEMENT INFORMATION
512 COMMUNICATION PATH MANAGEMENT INFORMATION
513 SERVER MANAGEMENT INFORMATION
514 NETWORK APPARATUS MANAGEMENT INFORMATION
515 STORAGE APPARATUS MANAGEMENT INFORMATION
516 FUNCTION MANAGEMENT INFORMATION
517 OPERATION MANAGEMENT PROGRAM
52 CONTROL UNIT
521 RECEPTION UNIT
522 FIRST SPECIFICATION UNIT
523 SECOND SPECIFICATION UNIT
524 GENERATION UNIT
525 OUTPUT UNIT
53 MEMORY
54 IF UNIT

What is claimed is:

1. An operation management apparatus comprising:
at least one memory configured to store:
  instructions;
  a plurality of pieces of communication path information each associating a system element of a communication source, a system element of a communication destination, a via-apparatus, and a timeout value in the system element of the communication source with each other; and
  a plurality of pieces of service definition information each associating a service and some of the plurality of pieces of communication path information,
  wherein the timeout value indicates a threshold of a waiting time of a communication response that is allowable in the system element of the communication source; and
at least one processor configured to execute the instructions to:
  receive at least one designation of the service definition information corresponding to an interrupted service, from among the plurality of pieces of service definition information;
  specify, some of the plurality of pieces of communication path information included in the designated service definition information as a plurality of pieces of specific communication path information;
  specify, with respect to each of the plurality of pieces of specific communication path information, the via-apparatus, the system element of the communication destination, and the timeout value;
  when a same via-apparatus is specified for two or more of the plurality of pieces of specific communication path information, specify a shorter timeout value among the timeout values in the system elements of the communication source defined in the two or more of the plurality of pieces of specific communication path information; and
  generate output information indicating a failure probability based on the specified timeout value for the via-apparatus.

2. The operation management apparatus according to claim 1, wherein the at least one processor is further configured to execute the instructions to:
  specify, as the specific communication path information, communication path information that is common among the pieces of communication path information defined in respective pieces of designated service definition information, when the operation management apparatus receives two or more designations of the service definition information.

3. The operation management apparatus according to claim 1, wherein
  the system element of the communication destination includes a pair of a server and a function.

4. An operation management method comprising:
storing, by a computer:
  a plurality of pieces of communication path information each associating a system element of a communication source, a system element of a communication destination, a via-apparatus, and a timeout value in the system element of the communication source with each other; and
  a plurality of pieces of service definition information each associating a service and some of the plurality of pieces of communication path information,
  wherein the timeout value indicates a threshold of a waiting time of a communication response that is allowable in the system element of the communication source;
receiving, by the computer, at least one designation of the service definition information corresponding to an interrupted service, from among the plurality of pieces of service definition information;
specifying, by the computer, some of the plurality of pieces of communication path information included in the designated service definition information as a plurality of pieces of specific communication path information;

specifying, by the computer and with respect to each of the plurality of pieces of specific communication path information, the via-apparatus, the system element of the communication destination, and the timeout value;

when a same via-apparatus is specified for two or more of the plurality of pieces of specific communication path information, specifying, by the computer, a shorter timeout value among the timeout values in the system elements of the communication source defined in the two or more of the plurality of pieces of specific communication path information; and generating, by the computer, output information indicating a failure probability based on the specified timeout value for the via-apparatus.

5. A non-transitory computer readable medium storing an operation management program executable by a computer to perform:

storing:
- a plurality of pieces of communication path information each associating a system element of a communication source, a system element of a communication destination, a via-apparatus, and a timeout value in the system element of the communication source with each other; and
- a plurality of pieces of service definition information each associating a service and some of the plurality of pieces of communication path information, wherein the timeout value indicates a threshold of a waiting time of a communication response that is allowable in the system element of the communication source;

receiving, by the computer, at least one designation of the service definition information corresponding to an interrupted service, from among the plurality of pieces of service definition information;

specifying some of the plurality of pieces of communication path information included in the designated service definition information as a plurality of pieces of specific communication path information;

specifying, with respect to each of the plurality of pieces of specific communication path information, the via-apparatus, the system element of the communication destination, and the timeout value;

when a same via-apparatus is specified for two or more of the plurality of pieces of specific communication path information, specifying a shorter timeout value among the timeout values in the system elements of the communication source defined in the two or more of the plurality of pieces of specific communication path information; and generating output information indicating a failure probability based on the specified timeout value for the via-apparatus.

* * * * *